United States Patent [19]

Miyauchi et al.

[11] Patent Number: 5,843,566
[45] Date of Patent: Dec. 1, 1998

[54] LAMINATED TRANSPARENT PAPER

[75] Inventors: Masahiro Miyauchi; Yukihiro Tachifuji, both of Tokyo, Japan

[73] Assignee: Mitsubishi Paper Mills Limited, Tokyo, Japan

[21] Appl. No.: 900,167

[22] Filed: Jul. 25, 1997

Related U.S. Application Data

[63] Continuation of Ser. No. 531,974, Sep. 21, 1995, abandoned.

[30] Foreign Application Priority Data

| Sep. 27, 1994 | [JP] | Japan | ................................. | 6-231428 |
| May 30, 1995 | [JP] | Japan | ................................. | 7-131796 |

[51] Int. Cl.$^6$ ............................. B32B 27/10; B32B 27/12; D21H 19/80; D21H 27/32
[52] U.S. Cl. .......................... 428/220; 428/332; 428/481; 428/535; 428/537.7; 162/123; 162/125; 162/135
[58] Field of Search .................................. 428/480, 481, 428/532, 533, 534, 535, 537.5, 507, 511, 514; 427/411; 162/123, 124, 125, 135

[56] References Cited

U.S. PATENT DOCUMENTS

| 4,569,888 | 2/1986 | Muller et al. | ............................. | 428/481 |
| 4,603,079 | 7/1986 | Nishizaki et al. | ....................... | 428/323 |
| 4,869,955 | 9/1989 | Ashcraft et al. | .......................... | 428/327 |
| 5,161,829 | 11/1992 | Detrick et al. | ............................. | 283/91 |
| 5,207,871 | 5/1993 | Murphy et al. | ........................ | 162/164.7 |
| 5,407,718 | 4/1995 | Popat et al. | ................................. | 428/42 |
| 5,458,949 | 10/1995 | Komiyama et al. | ..................... | 428/141 |
| 5,466,521 | 11/1995 | Sato et al. | ................................ | 428/330 |
| 5,514,462 | 5/1996 | Endo et al. | ............................... | 428/323 |

FOREIGN PATENT DOCUMENTS

| 0650851 A | 5/1995 | European Pat. Off. . |
| 59-109061 A | 6/1984 | Japan . |
| 62-28465 | 6/1984 | Japan . |
| 60-032059 A | 2/1985 | Japan . |
| 04018200 A | 1/1992 | Japan . |
| 4-18200 | 1/1992 | Japan . |
| 7064313 | 3/1995 | Japan . |
| 7064315 A | 3/1995 | Japan . |

*Primary Examiner*—John J. Zimmerman
*Assistant Examiner*—Michael LaVilla
*Attorney, Agent, or Firm*—Finnegan, Henderson, Farabow, Garrett & Dunner, L.L.P.

[57] ABSTRACT

A laminated transparent paper is disclosed therein which is obtained by laminating transparent papers on both the surfaces of a transparent polyester film via an adhesive, the surfaces of the transparent papers having coating layers of a coating solution mainly comprising an aqueous dispersion of at least one selected from the group consisting of an acrylonitrile-vinylformal-acrylic acid ester copolymer, a styrene-acrylic acid copolymer and a styrene-methacrylic acid copolymer, the laminated transparent paper having a Bekk smoothness of 20 seconds or more and an opacity of 45% or less. The laminated transparent paper permits obtaining precise printing without feathering when printing is made by the seal of a stamp ink or by a plotter or a printer of an ink jet system, suppresses the formation of roughness on a paper surface after the printing and drying, inhibits the deterioration of strength such as tearing strength at the time of heat fixing in a copying operation by an electrophotography system, and prevents blister from occurring owing to the separation of an adhesive layer.

2 Claims, No Drawings

LAMINATED TRANSPARENT PAPER

This application is a continuation of application Ser. No. 08/531,974, filed Sep. 21, 1995, now abandoned.

BACKGROUND OF THE INVENTION (i) Field of the Invention

The present invention relates to a laminated transparent paper for use in plan-drawing and second master drawing. More specifically, it relates to a laminated transparent paper which permits obtaining precise printing without feathering when printing is made by the seal of a stamp ink or by a plotter or a printer of an ink jet system, suppresses the formation of roughness on a paper surface after the printing and drying, inhibits the deterioration of strength such as tearing strength at the time of heat fixing in a copying operation by an electrophotography system, and prevents blister from occurring owing to the separation of an adhesive layer.

(ii) Description of the Prior Art

Heretofore, tracing papers are typical of transparent papers which have been used for plan-drawing and second master drawing. The tracing papers suitable for tracing and diazo-type copying can be classified into two kinds of natural tracing papers and impregnated tracing papers. The natural tracing papers are papers made by sufficiently beating a pulp fiber so that the void ratio of a paper layer may be decreased to about 15 to 25%. On the other hand, the impregnated tracing papers are papers obtained by impregnating usual papers with a transparent resin having a refractive index close to that of a cellulose.

As the characteristics of the natural tracing papers, these papers largely expand or contract in compliance with the change of humidity, since they are made by the sufficient beating. In particular, the lateral expansion and contraction are large, and so the dimensional stability of the natural tracing papers is poorer as compared with the usual paper and the impregnated tracing papers. For this reason, these papers largely curl, and the surfaces of the papers inconveniently become rough, when the papers are wet with water, a stamp ink or an aqueous ink mainly used in a plotter or a printer of an ink jet system. In addition, when the natural tracing papers are used as the papers for the second master drawing and when they are subjected to heat fixing in a copying operation by an electrophotography system, tearing strength and folding endurance of the natural tracing papers noticeably deteriorate.

As the characteristics of the impregnated tracing papers, the hydrophilic property of these papers is low, because they are impregnated with a synthetic resin. Therefore, when the stamp ink or the aqueous ink mainly used in the plotter or the printer of the ink jet system is used for the printing, the absorption of the ink is poor, so that drying failure and the feathering of the ink take place, and written lines are not sharp. Furthermore, the resin with which the papers are impregnated has an influence on the ink, and as water in the ink evaporates, the density of the written lines lowers and the hue of the lines also largely changes sometimes.

In addition to a paper base, matted films of a film base (mainly polyester films) are also present. A matting technique can be classified into a sand matting system and a chemical matting system. According to the sand matting system, the surfaces of the polyester films are made physically rough, and according to the chemical matting system, mat surfaces are formed on the surfaces of the polyester films by coating. Usually, on the surfaces of the mats obtained by both of the sand matting system and the chemical matting system, antistatic layers are formed.

The matted films of the film base have a high transparency and are excellent in dimensional stability and physical strength, but the ink absorbency of the matted films is poorer than the impregnated papers. In consequence, a long time is taken to dry the matted films, which means that a working efficiency is low. In addition, as water vaporizes from the ink, the crystals of a dye precipitate on the films, so that the so-called bronzing phenomenon occurs which emits a metallic luster, and the density of the written lines deteriorates and the hue of the lines noticeably changes inconveniently.

As a technique for solving such problems, it has been attempted to stick papers on both the surfaces of the film as a base material. For example, Japanese Patent Publication No. (Sho) 62-28465 has disclosed a method which comprises sticking extremely thin papers on both the surfaces of a transparent synthetic resin film, and then impregnating the extremely thin papers with a thermoplastic synthetic resin. In this publication, polystyrene and polyacrylic acid esters are exemplified as the synthetic resins, but each single resin is impregnated with an organic solvent. Therefore, this disclosed method has the problem of poor ink absorption. Moreover, Japanese Patent Application Laid-open No. (Hei) 4-18200 has disclosed a method which comprises laminating Japanese papers on either surface or both surfaces of a plastic film via an adhesive, and then carrying out a super calendar treatment. However, the paper layer of the Japanese paper is not dense owing to its specific manufacturing process, and the coarse fibrous state on the surface of the Japanese paper can be changed into a flat state only by the super calendar treatment, as described in the patent. However, the super calendar treatment can improve the surface state of the paper, but it cannot substantially make the whole paper layer dense. Therefore, when the seal is put with a stamp ink or when printing is given by a plotter or a printer of an ink jet system, the paper becomes fluffy and the unevenness of the ink absorption takes place, so that feathering occurs.

Furthermore, if the paper is thickly coated with a resin having high covering properties so as to lose air permeability, or if the compatibility of the paper with an adhesive is poor, an adhesive layer is liable to peel off at the time of heat fixing in a copying operation by an electrophotography system. Particularly in the case that the paper layer is dense or it is impregnated with a transparentizing agent, there is a tendency that the compatibility of the paper with an adhesive is poor, and even if a fixing temperature is relatively low, the peeling often occurs and blister takes place on the paper inconveniently. Accordingly, any paper which can meet all of the above-mentioned requirements has not been obtained so far.

SUMMARY OF THE INVENTION

The present invention has been intended to solve these drawbacks, and an object of the present invention is to provide a laminated transparent paper which has printing properties and ink absorbency of papers, a high transparency of films, such dimensional stability as not to be affected by humidity, and such strength as not to deteriorate by heat, permits a precise printing quality without feathering when the printing is made by the seal of a stamp ink or by a plotter or a printer of an ink jet system, prevents the color change of printed lines, inhibits the formation of roughness on a paper surface after the printing and drying, are suitable for copying by an electrophotography system and copying by a high-speed diazo-type system.

The first aspect of the present invention is directed to a laminated transparent paper obtained by laminating transparent papers on both the surfaces of a transparent polyester film via an adhesive, the surfaces of the transparent papers constituting the laminated transparent paper having coating layers of a coating solution mainly comprising an aqueous dispersion of at least one selected from the group consisting of an acrylonitrile-vinylformal-acrylic acid ester copolymer, a styrene-acrylic acid copolymer and a styrene-methacrylic acid copolymer.

The second aspect of the present invention is directed to a laminated transparent paper wherein the coating amount of the coating solution mainly comprising the aqueous dispersion of at least one selected from the group consisting of an acrylonitrile-vinylformal-acrylic acid ester copolymer, a styrene-acrylic acid copolymer and a styrene-methacrylic acid copolymer is in the range of from 0.03 to 1.0 g/m² in terms of a solid content on one surface of the paper.

The third aspect of the present invention is directed to a laminated transparent paper wherein with regard to the laminated transparent paper, a Bekk smoothness according to a JIS P-8119 method is 20 seconds or more, and an opacity according to a JIS P-8138 method is 45% or less.

The fourth aspect of the present invention is directed to a laminated transparent paper which is prepared by the use of a cellulose fiber beaten so that a freeness of the transparent papers to be laminated may be a Canadian standard freeness (csf) of 100 ml or less and in which a basis weight is 30 g/m² or less and an opacity according to a JIS P-8138 method is 30% or less.

The fifth aspect of the present invention is directed to a laminated transparent paper which is a natural tracing paper type in which a void ratio of a paper layer of the laminated paper is in the range of from 15 to 25%.

DETAILED DESCRIPTION OF THE PREFERRED EMBODIMENTS

The present inventors have intensively investigated on transparent papers, and as a result, it has been found that the object of the present invention can be achieved by a laminated transparent paper obtained by laminating transparent papers on both the surfaces of a transparent polyester film via an adhesive, the surfaces of the laminated transparent paper having coating layers of a coating solution mainly comprising an aqueous dispersion of at least one selected from the group consisting of an acrylonitrile-vinylformal-acrylic acid ester copolymer, a styrene-acrylic acid copolymer and a styrene-methacrylic acid copolymer, the laminated transparent paper having a Bekk smoothness according to a JIS P-8119 method of 20 seconds or more and an opacity according to a JIS P-8138 method of 45% or less. More preferably, the transparent papers are prepared by the use of a cellulose fiber beaten so that a freeness of the transparent paper may be a Canadian standard freeness (csf) of 100 ml or less, and the laminated transparent paper has a basis weight of 30 g/m² or less and an opacity according to a JIS P-8138 method of 30% or less.

Next, the content of the present invention will be described in more detail.

A polyester film which can be used as a base material to be laminated is a polymeric compound having an ester linkage in a constitutional molecular chain. Typical examples of the polymeric compound include polyalkylene terephthalates such as polyethylene terephthalate, but no particular restriction is put on the polymeric compound, so far as it does not deviate from the gist of the present invention. In addition, the surface of the polyester film can be treated with an adhesive improver, an antistatic agent or the like. No particular restriction is put on the thickness of the polyester film, but if the thickness of the polyester film is less than 10 μm, the polyester film cannot resist against the expansion and contraction of the transparent papers which are stuck, after printing by the use of a plotter or a printer of an ink jet system and then drying, so that uneven portions appear on the surfaces of the papers on occasion. Conversely, if it is more than 40 μm, the flexibility of the film is lost, so that the adhesive properties of the polyester film to a diazo paper deteriorates when the laminated transparent paper is used as a paper for diazo-type copying, with the result that an image obtained by the copying tends to become unpreferably obscure.

Examples of the suitably usable adhesive include urea resin adhesives, melamine resin adhesives, phenolic adhesives, resorcinol adhesives, epoxy adhesives, polyurethane adhesives, polyester adhesives, vinyl acetate adhesives, ethylene-vinyl acetate adhesives, acrylic adhesives, cyanoacrylic adhesives, copolymerized nylon adhesives and modified rubber adhesives. Above all, the polyurethane adhesives are preferable from the viewpoints of adhesive strength, heat resistance and the like. Furthermore, in the case that it is desired to avoid the yellowing of the paper by ultraviolet rays, the polyurethane adhesives in which an aliphatic isocyanate curing agent is used, can be employed.

The coating amount of the adhesive is in the range of from about 4 to 10 g/m² in terms of a dry coating amount. If the coating amount of the adhesive is less than 4 g/m², the adhesive strength between the transparent paper and the polyester film is weak, so that there cannot be prevented the separation of the adhesive layer and the generation of the blister which are caused by heat at the time of heat fixing in a copying operation by an electrophotography system. Conversely, if it is more than 10 g/m², the adhesive strength between both the paper and the film increases, but the concentration of the adhesive must be enhanced in order to obtain the desired coating amount in a lamination step. Such enhancement of the adhesive concentration increases the viscosity of the adhesive, so that the uniform adhesive surface cannot be obtained any more, which leads to the unevenness of the adhesion. In addition, it is also difficult to dry the adhesive, so that undried portions are unpreferably present on occasion.

No particular restriction is put a process for preparing the transparent papers which are laminated on the polyester film, so far as it can prepare the laminating papers having an opacity of 45% or less. A natural tracing paper type is good which has been prepared by highly beating a wood pulp fiber so that the void ratio of the paper layer may be in the range of from about 15 to 25%. Examples of the usable wood pulp include NBKP, NBSP, LBKP and LBSP, and they are mixed in a ratio in compliance with a use purpose, when used. In the paper material, various kinds of inner auxiliary agents for paper making can be selected and used if necessary, and examples of the inner auxiliary agents include anionic, nonionic, cationic and ampholytic yield improvers, a freeness agent, a paper strengthen agent and an inner adjunct sizing agent. In addition, other inner auxiliary agents for paper making such as a dye, a pH adjustor, an antifoaming agent, a pitch controlling agent and a slime controlling agent can also suitably be added in compliance with the use purpose. As a paper machine, there can be suitably used a Fourdrinier paper machine, a double wire machine, a combination paper machine, a cylinder paper machine or a Yankee paper machine which is known in the paper making field.

If the Bekk smoothness on the surfaces of the laminating transparent papers is less than 20 seconds, an image printed by the use of a plotter or a printer of an ink jet system or written with a pen tends to feather and cut, so that the image loses its sharpness.

The particularly preferable transparent papers which are to be laminated on the polyester film are natural type transparent papers which are prepared by the use of a cellulose fiber beaten so that a freeness of the transparent papers may be 100 ml or less and in which an opacity is 30% or less and a basis weight is 30 g/m² or less. If the freeness of the laminating transparent papers is larger than 100 ml (csf), the paper layer is not dense and surface strength is weak, and there is a tendency that the opacity is in excess of 30%. In addition, in the case that the basis weight is 30 g/m² or less through the paper layer is not dense, the adhesive oozes onto the surface of the paper in the lamination step, and there is a problem that the printed ink excessively penetrates through the paper layer to the adhesive layer. If the surface strength is weak, portions printed by the plotter or the printer of the ink jet system become fluffy. If the opacity is in excess of 30%, the opacity of the laminated papers is also eventually in excess of 45%, so that at the time of diazo-type copying, the sharp image cannot be expected. If the basis weight of the laminated papers is in excess of 30 g/m², the resultant laminating papers impede the effect of the film which is the base material, and when the printing is made by the plotter or the printer of the ink jet system, the expansion and contraction of the transparent papers take place, so that the uneven portions on the surfaces of the papers increase.

In the coating method of a coating layer with a coating solution mainly comprising an aqueous dispersion of at least one selected from the group consisting of an acrylonitrile-vinylformal-acrylic acid ester copolymer, a styrene-acrylic acid copolymer and a styrene-methacrylic acid copolymer which is the feature of the present invention, a device such as a blade coater, a roll coater, an air-knife coater, a bar coater, a rod blade coater or a curtain coater can be used, after the preparation of the transparent papers and the lamination step. Alternatively, in the preparation step of the transparent papers, a device such as a conventional sizing press, a gate roll sizing press or an inclined sizing press can be used as a surface sizing device. After the coating operation, a calender such as a machine calender or a supercalender may be used for finishing.

The coating amount of the coating solution comprising the aqueous dispersion of at least one selected from the group consisting of the acrylonitrile-vinylformal-acrylic acid ester copolymer, the styrene-acrylic acid copolymer and the styrene-methacrylic acid copolymer is in the range of from 0.03 to 1.0 g/m², preferably from 0.05 to 0.5 g/m² in terms of a solid content on one surface of the paper.

If the coating amount of the coating solution is less than 0.03 g/m², the surface of the paper cannot be uniformly covered with the resin, and the feathering of the ink along the fiber cannot be completely eliminated.

If it is more than 1.0 g/m², the paper is conversely covered with a thick resin layer, so that the absorbency of the ink is impaired. In consequence, the undried ink soils the print surface of the paper, and the drying unevenness of the ink and ink repellency occur on occasion.

Furthermore, some additives can be added to the coating solution, and examples of the additives include binders such as starch and polyvinyl alcohol, dimensional stabilizers such as ethylene-urea resin, inorganic conductive agents such as sodium chloride and potassium chloride, organic conductive agents, surface active agents, pigments and dyes.

As a means for preventing the penetration of the excess ink, there is a technique of adding an inner adjunct sizing agent to the coating solution. Examples of the inner adjunct sizing agent include a reinforced rosin sizing agent, an emulsion sizing agent, a petroleum resin sizing agent, an alkenyl succinate sizing agent, an alkyl ketene dimer sizing agent, an alkenyl succinic anhydride sizing agent, a synthetic cationic sizing agent and a neutral rosin sizing agent. For the purpose of revealing sizing properties, it is possible to add polyvalent metallic compounds such as aluminium compounds and the like (e.g., an aluminum sulfate, poly-aluminum chloride, polyaluminum silicate sulfate and sodium aluminate).

The laminated transparent paper of the present invention can be obtained by laminating transparent papers on both the surfaces of a transparent polyester film via an adhesive, the surface of the laminated transparent paper being coated with a coating solution mainly comprising an aqueous dispersion of at least one selected from the group consisting of an acrylonitrile-vinylformal-acrylic acid ester copolymer, a styrene-acrylic acid copolymer and a styrene-methacrylic acid copolymer, a Bekk smoothness being 20 seconds or more, an opacity being 45% or less. More preferably, the transparent paper of the present invention is characterized in that a freeness of the transparent paper to be laminated is a Canadian standard freeness (csf) of 100 ml or less and an opacity is 30% or less. Concretely, the laminated transparent paper of the present invention has a dimensional stability which is not affected by humidity, because the polyester film is used as the base material, and there can be prevented the deterioration of tearing strength and the like which is caused by heat at the time of heat fixing in a copying operation by an electrophotography system. In addition, even after the adhesion of water or the ink to the laminated transparent paper and then drying, the formation of uneven portions on the surface of the paper can be inhibited. Furthermore, since the coating layer is formed, the laminated transparent paper can particularly prevent ink feathering and is excellent in the heat fixing properties of a toner in the copying operation by the electrophotography system. The principle of this function is not definite, but it can be supposed that from the characteristics of the transparent papers based on the manufacturing process, they are matched with more delicate surface characteristic balance than required in a usual paper and film, with regard to the absorbency of the ink and the fixing properties of the toner. That is to say, in the laminated transparent paper of the present invention, the void ratio of the paper layer is lower as compared with the usual paper, and so the ink slowly penetrates in a vertical direction. Thus, while the ink is in an undried state on the paper, the ink easily feathers in a horizontal direction along fibers. In particular, the ink of an ink jet printer having a lower surface tension than water exhibits this tendency noticeably. In the electrophotography system, the adhesive on the surface of the toner is molten and fused by heat, whereby the toner can be fixed, but the reason why this adhesive is difficult to penetrate in the vertical direction of the paper is that the same phenomenon as in the case of the ink occurs, so that the fixing properties are poor. Accordingly, the surface of the transparent paper is coated with a coating solution mainly comprising an aqueous dispersion of at least one selected from the group consisting of an acrylonitrile-vinylformal-acrylic acid ester copolymer, a styrene-acrylic acid copolymer and a styrene-methacrylic acid copolymer, whereby a suitable compatibility of the coated layer with the ink or the adhesive on the toner surface can be exerted to meet the above-mentioned requirements. Furthermore, a sufficient feathering prevention effect can be obtained by the use of a small amount of the coating solution, and so a relatively good air permeability can be maintained without covering the surface of the transparent paper with the thick resin coating film. In the case that the coating layers are formed on both the surfaces of the transparent paper, the compatibility of the transparent paper with the laminating adhesive can be improved and hence the close contact state of them can be enhanced, so that there can be more effectively prevented the separation of the adhesive layer and the generation of blister which are caused by heat at the time of heat fixing in a copying operation by an electrophotography system.

EXAMPLES

Now, the present invention will be described in more detail with reference to examples, but the scope of the present invention should not be limited to these examples at all.

Example 1

One surface of a PET (Polyethylene terephthalate) film having a thickness of 12 μm (trade name H500, made by Diafoil Hext Co., Ltd.) was coated with an adhesive having the following blend in a dry coating amount of about 5 g/m², and a used solvent was then volatilized to form an adhesive surface on the PET film. On the other hand, transparent papers having a basis weight of 20 g/m², an opacity of 25% and a Bekk smoothness of 50 seconds were prepared from a cellulose fiber beaten so that its freeness might be 85 ml, and the surface of one transparent paper was coated with a coating solution mainly comprising an aqueous dispersion of an acrylonitrile-vinylformal-acrylic acid ester copolymer in a wet coating amount of about 10 g/m² by the use of a gravure coater, followed by drying. Next, the above-mentioned PET film was stuck on the back of the transparent paper by a dry lamination system so that the adhesive surface of the PET film might be brought into contact with the back surface of the transparent paper. Afterward, the opposite surface of the PET film was also subjected to the same treatment as described above, thereby obtaining a laminated transparent paper.

1. Blend of paper
   NBKP (freeness=85 ml) 900 pts. wt.
   Pitch controlling agent 3 pts. wt.
     (Mistron Vapor, made by Nippon Mistron Co., Ltd.)
   Inner adjunct sizing agent 6 pts. wt.
     (Colopearl S-50, made by Seiko Chemical Industry Co., Ltd.)
   Aluminium sulfate 14 pts. wt.
2. Blend of coating solution
   25 wt % aqueous dispersion of acrylonitrile-vinylformal-acrylic acid ester copolymer 40 pts. wt.
     (Basoplast 415DS, made by BASF Co., Ltd.) Water 960 pts. wt.
3. Blend of adhesive
   Seika Bond E-285B 100 pts. wt.
     (Dainichiseika Co., Ltd.)
   Seika Bond C-75N 10 pts. wt.
     (Dainichiseika Co., Ltd.)
   Ethyl acetate 100 pts. wt.

Example 2

The same procedure as in Example 1 was carried out except that transparent papers to be laminated were prepared from a cellulose fiber beaten so that its freeness might be 50 ml, instead of a cellulose fiber beaten so that its freeness might be 85 ml, thereby obtaining a laminated transparent paper.

Example 3

The same procedure as in Example 1 was carried out except that in a step of preparing transparent papers, a coating solution was sizing-pressed so that a wet coating amount of the coating solution on both surfaces might be about 20 g/m², instead of coating the transparent papers for lamination with the coating solution by the use of a gravure coater, thereby obtaining a laminated transparent paper.

Example 4

The same procedure as in Example 1 was carried out except that, in the blend of a coating solution used in Example 1, 50 parts by weight of a 20 wt % aqueous dispersion of a styrene-acrylic acid resin (Polymaron 1343S, made by Arakawa Chemical Co., Ltd.) and 950 parts by weight of water were used in place of 40 parts by weight of a 25 wt % aqueous dispersion of an acrylonitrile-vinylformal-acrylic acid ester copolymer and 960 parts by weight of water, thereby obtaining a laminated transparent paper.

Example 5

The same procedure as in Example 1 was carried out except that, in the blend of a coating solution used in Example 1, 67 parts by weight of a 15 wt % aqueous dispersion of a styrene-methacrylic acid resin (SS-315, made by Nippon PMC Co., Ltd.) and 933 parts by weight of water were used in place of 40 parts by weight of a 25 wt % aqueous dispersion of an acrylonitrile-vinylformal-acrylic acid ester copolymer and 960 parts by weight of water, thereby obtaining a laminated transparent paper.

Example 6

The same procedure as in Example 3 was carried out except that, in the blend of a coating solution used in Example 1, 20 parts by weight of a 25 wt % aqueous dispersion of an acrylonitrile-vinylformal-acrylic acid ester copolymer and 25 parts by weight of a 25 wt % aqueous dispersion of a styrene-methacrylic acid resin (Polymaron 1343S, made by Arakawa Chemical Co., Ltd.) and 955 parts by weight of water were used in place of 40 parts by weight of a 25 wt % aqueous dispersion of an acrylonitrile-vinylformal-acrylic acid ester copolymer and 960 parts by weight of water, thereby obtaining a laminated transparent paper.

Example 7

The same procedure as in Example 3 was carried out except that, in the blend of a coating solution used in Example 1, 20 parts by weight of a 25 wt % aqueous dispersion of an acrylonitrile-vinylformal-acrylic acid ester copolymer, 50 parts by weight of a 10% oxidized starch (MS-3800, made by Nippon Shokuhin Kakou Co., Ltd.) and 930 parts by weight of water were used in place of 40 parts by weight of a 25 wt % aqueous dispersion of an acrylonitrile-vinylformal-acrylic acid ester copolymer and 960 parts by weight of water, thereby obtaining a laminated transparent paper.

Example 8

The same procedure as in Example 3 was carried out except that transparent papers having a basis weight of 20 g/m², an opacity of 25% and a Bekk smoothness of 20 seconds were prepared by lowering a linear pressure of a machine calender so as to decrease the smoothness and then used in place of transparent papers used in Example 1, thereby obtaining a laminated transparent paper.

Example 9

The same procedure as in Example 3 was carried out except that transparent papers having a basis weight of 15 g/m², an opacity of 15% and a Bekk smoothness of 80 seconds were prepared and then used in place of transparent papers used in Example 1, thereby obtaining a laminated transparent paper.

Example 10

The same procedure as in Example 3 was carried out except that transparent papers having a basis weight of 30 g/m², an opacity of 30% and a Bekk smoothness of 30 seconds were prepared and then used in place of transparent papers used in Example 1, thereby obtaining a laminated transparent paper.

Comparative Example 1

A DX Tracing Paper N 75 made by Mitsubishi Paper Mills, Ltd. commercially available as a usual natural tracing paper which is not a laminated transparent paper.

Comparative Example 2

A commercially available sheet in which organic solvent solution of resin being impregnated papers were stuck on both the surfaces of a PET film having a thickness of 16 μm.

Comparative Example 3

A commercially available chemical matte sheet (which was obtained by directly coating the surface of a polyester film with an organic solvent solution of a resin to form a matte surface).

Comparative Example 4

The same procedure as in Example 3 was carried out except that, in the blend of a coating solution used in Example 1, 100 parts by weight of a 10% oxidized starch (MS-3800, made by Nippon Shokuhin Kakou Co., Ltd.) and 900 parts by weight of water were used in place of 40 parts by weight of a 25 wt % aqueous dispersion of an acrylonitrile-vinylformal-acrylic acid ester copolymer and 960 parts by weight of water, thereby obtaining a laminated transparent paper.

Comparative Example 5

The same procedure as in Example 3 was carried out except that, in the blend of a coating solution used in Example 1, 300 parts by weight of a 10% oxidized starch (MS-3800, made by Nippon Shokuhin Kakou Co., Ltd.) and 700 parts by weight of water were used in place of 40 parts by weight of a 25 wt % aqueous dispersion of an acrylonitrile-vinylformal-acrylic acid ester copolymer and 960 parts by weight of water, thereby obtaining a laminated transparent paper.

Comparative Example 6

The same procedure as in Example 3 was carried out except that transparent papers having a basis weight of 20 g/m², an opacity of 35% and a Bekk smoothness of 50 seconds were prepared from NBKP having a freeness of 115 ml and then used, instead of transparent papers used in Example 1, thereby obtaining a laminated transparent paper.

Comparative Example 7

The same procedure as in Example 3 was carried out except that transparent papers having a basis weight of 20 g/m², an opacity of 25% and a Bekk smoothness of 14 seconds were prepared by lowering a linear pressure of a machine calender so as to decrease the smoothness and then used in place of transparent papers used in Example 1, thereby obtaining a laminated transparent paper.

Comparative Example 8

The same procedure as in Example 3 was carried out except that transparent papers having a basis weight of 38 g/m², an opacity of 30% and a Bekk smoothness of 30 seconds were prepared and then used in place of transparent papers used in Example 1, thereby obtaining a laminated transparent paper.

The characteristics of samples obtained in the examples and the comparative examples were measured as follows.

(1) Dimensional change rate: The moisture content of a sample was adjusted under circumstances of a temperature of 20° C. and a humidity of 65%, and the length of the sample was precisely measured. After this sample was immersed in water at a temperature of 20° C. for 10 minutes, the length of the sample was measured, and a dimensional change rate to the original size was calculated. In succession, this sample was dried under circumstances of a temperature of 20° C. and a humidity of 65% to adjust its moisture content, and the length of the sample was measured again and a dimensional change rate to the original size was calculated. The absolute values of the thus calculated two dimensional change rates were summed to obtain the dimensional change rate. The length of the sample was obtained by measuring the transverse side of the paper.

(2) Suitability for a plotter and a printer of an ink jet printer system: Printing was carried out by the use of an ink jet printer BJC-600J made by Canon Inc., and with regard to the smear, feathering and color change of written lines and characters as well as the uneven portions of dried papers, comparison was made.

In tables, ⊚ means "very good", ○ means "good", Δ means "slightly good", and X means "bad".

(3) Opacity: It is a Hunter opacity value (%) measured in accordance with JIS P-8138. The lower the Hunter opacity value is, the higher a transparency is.

(4) Smoothness: It can be measured by a smoothness test method by a JIS P-8119 method and a Bekk tester for papers and paperboards. The higher the value of the smoothness is, the higher the smoothness is.

(5) Suitability for copying by a electrophotography system: Samples were printed by the use of an ink jet printer HP Tezain Jet 650 made by Yokokawa·Hulet Packerd Co., Ltd., and each of the thus printed samples as manuscripts was copied as many as 10 sheets by a copying machine Fuji Zerox 5080II made by Fuji Zerox Co., Ltd. At this time, paper driving properties at the copying operation, blister and tearing strength after the copying were compared.

In the tables, ⊚ means "very good", ○ means "good", Δ means "slightly good", and X means "bad".

(6) Suitability for diazo copying: Each of samples as manuscripts copied by Fuji Zerox 5080II made by Fuji Zerox Co., Ltd. was copied as many as 10 sheets by a copying machine Ricopy PL5010 made by Ricoh Co., Ltd., and paper driving properties at the copying operation, stain on unprinted portions, the sharpness of the printed lines and omission were compared.

In the tables, ⊚ means "very good", ○ means "good", Δ means "slightly good", and X means "bad".

The results of the above-mentioned tests are shown in Tables 1 and 2.

TABLE 1

| | Dimensional Change Rate (%) | Suitability for Ink Jet Printer | | | | Opacity (%) | Smoothness (sec) |
| --- | --- | --- | --- | --- | --- | --- | --- |
| | | Smear | Feathering | Color Change | Unevenness | | |
| Example 1 | 0.34 | ○ | ⊙ | ○ | ○ | 35 | 50 |
| Example 2 | 0.42 | ○ | ⊙ | ○ | ○ | 20 | 50 |
| Example 3 | 0.30 | ○ | ⊙ | ○ | ○ | 30 | 50 |
| Example 4 | 0.33 | ○ | ○ | ○ | ○ | 35 | 50 |
| Example 5 | 0.35 | ○ | ○ | ○ | ○ | 33 | 50 |
| Example 6 | 0.28 | ○ | ○ | ○ | ○ | 30 | 50 |
| Example 7 | 0.32 | ○ | ○ | ○ | ○ | 35 | 50 |
| Example 8 | 0.33 | Δ | ○ | ○ | ○ | 38 | 20 |
| Example 9 | 0.35 | ⊙ | ⊙ | ○ | Δ | 16 | 80 |

TABLE 2

| | Dimensional Change Rate (%) | Suitability for Ink Jet Printer | | | | Opacity (%) | Smoothness (sec) |
| --- | --- | --- | --- | --- | --- | --- | --- |
| | | Smear | Feathering | Color Change | Unevenness | | |
| Example 10 | 0.43 | ○ | ○ | ○ | ○ | 40 | 30 |
| Comp. Ex. 1 | 10.8 | ○ | Δ | ○ | x | 30 | 27 |
| Comp. Ex. 2 | 0.30 | ○ | x | x | ○ | 40 | 95 |
| Comp. Ex. 3 | 0.00 | ○ | x | x | ○ | 25 | 95 |
| Comp. Ex. 4 | 0.28 | ○ | x | ○ | Δ | 33 | 50 |
| Comp. Ex. 5 | 0.30 | ○ | Δ | ○ | Δ | 35 | 50 |
| Comp. Ex. 6 | 0.25 | ○ | ○ | ○ | ⊙ | 51 | 50 |
| Comp. Ex. 7 | 0.31 | Δ | Δ | ○ | ○ | 32 | 14 |
| Comp. Ex. 8 | 0.40 | ○ | ○ | ○ | ○ | 49 | 30 |

| | Suitability for Copying by Electrophotography System | | | Suitability for Diazo Copying | | |
| --- | --- | --- | --- | --- | --- | --- |
| | Paper Driving Properties | Blister | Tearing Strength | Paper Driving Properties | Stain | Sharpness |
| Example 1 | ○ | ○ | ○ | ○ | ○ | ○ |
| Comp. Ex. 1 | ○ | ⊙ | Δ | ○ | ○ | ○ |
| Comp. Ex. 2 | x | x | ○ | x | Δ | ○ |
| Comp. Ex. 3 | ○ | ○ | ○ | ○ | ○ | ○ |
| Comp. Ex. 4 | ○ | ○ | ○ | ○ | x | Δ |
| Comp. Ex. 5 | ○ | Δ | ○ | ○ | x | Δ |
| Comp. Ex. 6 | ○ | ⊙ | ○ | ○ | x | x |
| Comp. Ex. 7 | ○ | ○ | ○ | ○ | ○ | x |
| Comp. Ex. 8 | ○ | ○ | ○ | ○ | Δ | x |

What is claimed is:

1. A laminated transparent paper comprising a transparent polyester film having two opposing surfaces, a layer of an adhesive applied on each of said opposing surfaces of said film, a layer of a transparent natural tracing paper having two opposing surfaces and prepared using cellulose fiber beaten so that the tracing paper has a void ratio in the range of about 15% to 25%, a first surface of which is adhered to said film by said adhesive, on each of said opposing surfaces of said film, and a coating layer applied on a second opposing surface of each of said layers of transparent natural tracing paper, said coating layer having been formed by coating the second surface of each of said layers of transparent natural tracing paper with a coating solution consisting essentially of an aqueous dispersion of at least one polymer selected from the group consisting of an acrylonitrile-vinylformal-acrylic acid ester copolymer, a styrene-acrylic acid copolymer and a styrene-methacrylic acid copolymer, wherein each of said coating layers has a solids content of from 0.03 to 1.0 g/m$^2$, and the laminated transparent paper has a BEKK smoothness of 20 seconds or more, as measured by the JIS P-8119 method, and an opacity of 45% or less, as measured by the JIS P-8138 method.

2. The laminated transparent paper according to claim 1, wherein said each of said transparent natural tracing papers has been prepared using a cellulose fiber beaten so that said transparent natural tracing paper has a Canadian standard freeness of 100 ml or less, and the laminated transparent paper has a basis weight of 30 g/m$^2$ or less and an opacity of 30% or less, as measured by the JIS P-8138 method.

* * * * *